United States Patent [19]
Kelman et al.

[11] Patent Number: 5,217,672
[45] Date of Patent: Jun. 8, 1993

[54] PREFORM FORMING AND CURING PROCESS AND AN APPARATUS FOR THE PROCESS

[75] Inventors: Josh Kelman, Dover, N.H.; Robert Hames, York, Me.

[73] Assignee: Davidson Textron Inc., Dover, N.H.

[21] Appl. No.: 925,267

[22] Filed: Aug. 6, 1992

[51] Int. Cl.⁵ .................................................. B27N 3/04
[52] U.S. Cl. ......................................... 264/517; 264/121; 425/80.1
[58] Field of Search .................. 264/517, 121, 518; 425/80.1, 82.1, 83.1

[56] References Cited

U.S. PATENT DOCUMENTS

| | | | |
|---|---|---|---|
| 3,177,275 | 4/1965 | Brenner | 264/517 |
| 3,544,414 | 12/1970 | Simison | 264/518 |
| 3,844,751 | 10/1974 | Stewart | 65/4 |
| 4,140,450 | 2/1979 | Pfeifer et al. | 425/82.1 |
| 4,865,788 | 9/1989 | Davis | 264/112 |
| 5,034,181 | 7/1991 | Billiu | 264/517 |
| 5,041,260 | 8/1991 | Johnson et al. | 264/510 |
| 5,057,166 | 10/1991 | Young, Sr. et al. | 156/62.2 |
| 5,093,059 | 3/1992 | Nathoo et al. | 264/121 |

*Primary Examiner*—Mary Lynn Theisen
*Attorney, Agent, or Firm*—Reising, Ethington, Barnard, Perry & Milton

[57] ABSTRACT

A preform (11) is formed from sprayed binder and chopped fibers from respective nozzles (21) and (18) onto a foraminous screen (14). A plurality of nozzles (33) are circumferentially spaced about nozzles (21) and (18) and provide heated air to cure the binder. The nozzles (18),(21), and (33) are affixed to each other and are mounted onto a gantry (32) for relative motion with respect to the screen (14). The heated air cures the preform (11) simultaneously with it formation.

11 Claims, 1 Drawing Sheet

PREFORM FORMING AND CURING PROCESS AND AN APPARATUS FOR THE PROCESS

TECHNICAL FIELD

The field of this invention relates generally to directed fiber preforming and, more particularly, to an improved process for forming a glass fiber preform.

BACKGROUND OF THE DISCLOSURE

Glass fibers have been commonly incorporated in thermoplastic molded objects and other cured plastics for added strength and durability. The glass fiber is introduced in a mold where resinous plastic is then injected such that the glass fibers become imbedded into the final formed object. It has been found advantageous to form a preform of the final object out of glass fibers and place the preform into the mold. The glass fibers are often chopped and blown onto a preform screen. Immediately following the fiber placement, a binder agent is sprayed on and allowed to cure which sets the fibers in place. The fiber may be a commercially available liquid thermoplastic resin or may be a binder powder. Such binder powder is described in copending patent application entitled IMPROVED METHOD OF FORMING A PREFORM WITH THE USE OF POWDER BINDER, Ser. No. 07/865,238 filed on Apr. 8, 1992, which is hereby incorporated by reference.

The curing of the binder has been a separate step that is sequentially commenced after the fiber has been sprayed and the binder applied to the screen. Often the cure step is accomplished at a separate work station. The screen assembly is physically moved to the cure work station where hot air guns apply heated air to the binder and fibers to cure the material into a set preform.

The sequential step of heating the binder after application is time consuming and demands added space for the extra work station. The added space and extra time greatly adds to the expense of preform manufacture. What is needed is a process that eliminates the separate cure step in forming a preform and provide simultaneous curing as the binder and fibers are being applied.

SUMMARY OF THE DISCLOSURE

In accordance with one aspect of the invention, a process is provided for manufacturing a fibrous preform for use in thermoplastic molding. The process includes the steps of drawing a vacuum through a foraminous screen, spraying chopped fibers, preferably glass fibers, and binder from respective nozzles onto the foraminous screen, and providing a heated air stream about the nozzles for curing the binder on the screen to form the preform on the foraminous screen simultaneously with the spraying of the chopped fibers and binder.

Preferably, the heated air stream is formed by a plurality of air nozzles circumferentially spaced about respective nozzles of the binder and glass fibers.

The process preferably includes the use of a powder binder being sprayed onto the chopped fibers. Alternately, the binder is a liquid thermoplastic.

In accordance with another aspect of the invention, a process for forming a preform includes the steps of spraying chopped fibers and binder from at least one nozzle onto the foraminous screen, providing a vacuum on the downstream side of the foraminous screen for drawing and retaining the binder and the fibers on said screen before curing, and providing a heated air stream simultaneous with the spraying of chopped fibers and binder directed to the foraminous screen for curing the binder with the fibers a the fibers and binder are being sprayed onto said foraminous screen.

In accordance with another aspect of the invention, an apparatus for the use in manufacturing fibrous preforms having a first nozzle for spraying chopped fibers out therefrom, a second nozzle for spraying a binder material out therefrom, a foraminous screen for receiving the chopped fibers and the binder material thereon, a plurality of nozzles circumferentially spaced about the respective first and second nozzle for supplying a flow of heated gaseous medium toward the foraminous screen to heat the screen and the binder and chopped fibers deposited thereon, and means for providing relative lateral motion in two planes between the foraminous screen and the respective nozzles.

Preferably, the respective first, second and plurality of nozzles are structurally affixed with respect to each other and are operably connected to a common platform such as a gantry to provide relative motion with respect to the screen. In addition, a vacuum means provides a draw of gaseous medium through said foraminous screen from a side where said plurality of nozzles are positioned to an opposite side.

In accordance with a broader aspect of the invention, an apparatus for the use in manufacturing fibrous preforms includes a means for applying heat onto said foraminous screen simultaneously with actuation of said first and second nozzles for spraying chopped fibers and binder onto said screen to provide curing of said binder with said chopped fibers.

BRIEF DESCRIPTION OF THE DRAWINGS

Reference now is made to the accompanying drawings in which.

DETAILED DESCRIPTION OF THE PREFERRED EMBODIMENT

Figure 1:
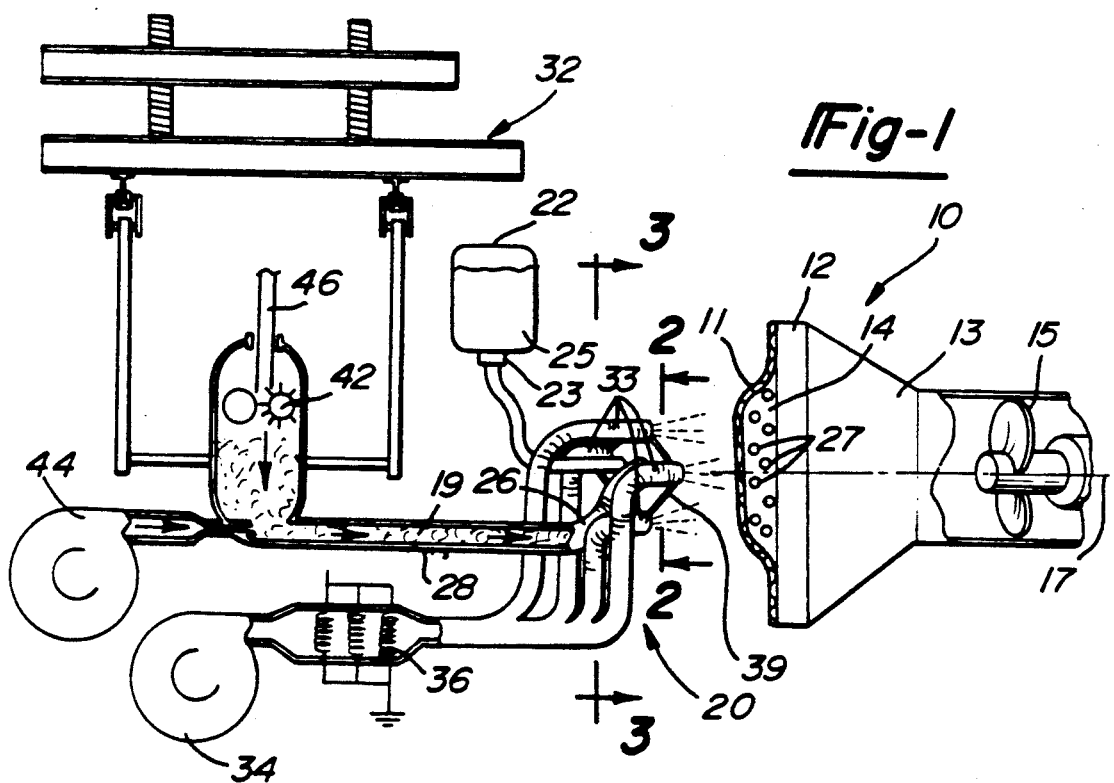
FIG. 1 is a schematic view of a preform apparatus in accordance with one embodiment of the invention.

Reference is now made to the drawings, particularly FIG. 1, which discloses a screen assembly 10 for forming a fiber glass preform 11. The screen assembly 10 includes a mounting table 12, a foraminous preform screen 14 and a suction fan 15. The screen 14 has a plurality of holes 27 and its contour conforms to the shape of one surface of the preform 11. The screen 14 is mounted about its periphery to the table 12 which in turn has appropriate duct work 13 for housing the suction fan 15. The suction fan when actuated draws a vacuum through the screen 14. The screen 14 may also be mounted for rotation about axis 17.

Figure 2:
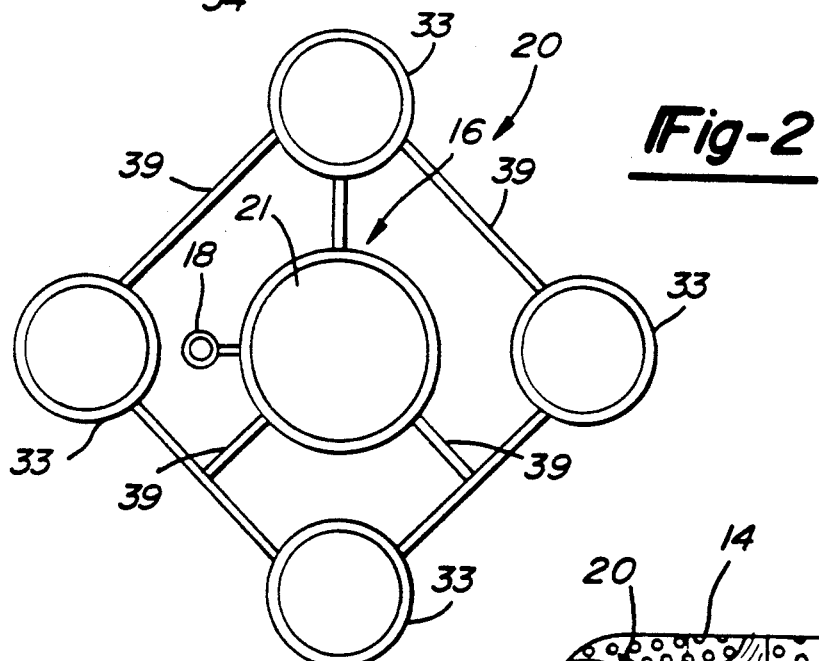
FIG. 2 is an enlarged side elevational view of the nozzle assembly for the fiber deposition apparatus taken along lines 2—2 shown in FIG. 1.

As illustrated in FIGS. 1 and 2, a nozzle assembly, generally indicated as 20, includes a spray assembly 16 having a nozzle 18 for deposition of blown glass fibers 19 and a nozzle 21 for the spraying of curable binder 25 from supply 22. The fiber nozzle 18 is the distal end of a flexible tube 26 which has its other end mounted onto a rigid delivery tube 28 communicating from a chopper 42 and blower 44. The blower 44 blows air to deliver chopped fibers 19 that exit chopper 42 through delivery tube 28. Chopper 42 chops supplied glass roving 46 and can be chopped to various lengths ranging from a fraction of an inch to several inches depending on the specific application and preform being formed. The glass roving used to make the chopped glass fibers 19 may be a commercially available roving such as one sold under the brand name PPG-5542.

A pump or blower 23 delivers the binder from the supply 22 to nozzle 21. The binder may be a dry powder made from a thermoplastic polyester material. Alternately, the binder may be a conventional liquid binder.

The tubes 26 and 28, nozzles 18, 21, chopper 42 and blower 44 are mounted on a gantry 32 that can move the nozzles 18 and 21 in any direction perpendicular to axis 17 relative to the screen 14.

Circumferentially spaced about the nozzles 18 and 21 are four air nozzles 33 operably connected to a blower 34 and heater 36. The four nozzles 33 are affixed to the nozzles 18 and 21 by bracket structure 39 of nozzle assembly 20 so that they also move with the gantry 32 with respect to the screen.

Figure 3:
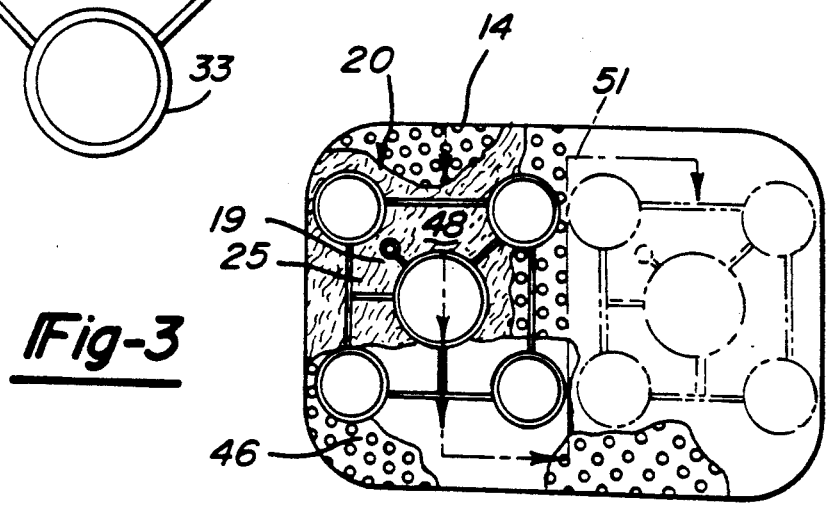
FIG. 3 is a plan view of the preform screen and preform illustrated in FIG. 1.

All the nozzles are pointed to the foraminous screen. The motion of the gantry 32 with respect to the screen 14 is controlled such that the binder and chopped fibers are selectively deposited onto the foraminous screen. The nozzle assembly 20 may move in a serpentine path 51 over the screen 14 as schematically illustrated in FIG. 3.

The blower 34 and heater 36 are actuated simultaneously with chopper 42, blower 42 and pump or blower 23 such that the fibers and binder are simultaneously deposited onto the screen 14 as the screen is heated by the heated air stream formed from nozzles 33. As shown in FIG. 3, the heated air may heat the screen section 46 before any fibers or binder are deposited thereon. The heated air also heats the screen section 48 that is already deposited with fibers 19 and binder 20 and retained thereon by the vacuum as well as the deposited binder and chopped fibers.

The fact that a heated air nozzle is on each side and above and below the fiber nozzle 18 and binder nozzle 23 allows heated air to precede the deposition of fibers and binder and to mix with the binder and fiber spray. Furthermore the heated air continues to be directed onto the screen assembly 10 after the deposition of the binder and fibers. In this fashion the binder is cured in a simultaneous fashion with the deposition of the binder and fibers. The cure takes place during the forming cycle.

A variation of the above embodiment may include a heater heating the air flow from blower 44 before it exits nozzle 18 as a substitute or as an augment to the heat from the nozzles 33. While four nozzles 33 are disclosed it should be understood that more heated air nozzles may be positioned about the nozzles 18 and 23. Furthermore it is foreseen that a single annular nozzle may substitute for the four nozzles to create a hot air stream onto the screen about the binder and fiber spray to simultaneously cure the preform with its formation step.

Other variations and modifications are possible without departing from the scope and spirit of the present invention as defined by the appended claims.

The embodiments in which an exclusive property or privilege is claimed are defined as follows:

1. A process for forming a preform comprising the steps of:
   drawing a vacuum through a foraminous screen;
   spraying chopped fibers and binder from respective nozzles onto said foraminous screen; and
   providing a heated air stream about said nozzles for curing said binder on said screen to form said preform on said foraminous screen simultaneously with the spraying of said chopped fibers and binder.

2. A process as defined in claim 1 further comprising:
   said heated air stream being formed by a plurality of air nozzles circumferentially spaced about said respective nozzles of said binder and chopped fibers.

3. A process as defined in claim 2 further comprising:
   said binder being a dry powder binder.

4. A process as defined in claim 2 further comprising:
   said binder being a liquid thermoplastic.

5. A process as defined in claim 2 further comprising:
   said air nozzles and said respective nozzles of said binder and said fibers being affixed to a common platform that is movable with respect to said foraminous screen.

6. A process for forming a preform comprising the steps of:
   spraying chopped fibers and binder from at least one nozzle onto said foraminous screen;
   providing a vacuum on a downstream side of the foraminous screen for drawing and retaining said binder and said fibers on said screen before curing; and
   providing a heated air stream simultaneous with the spraying of chopped fibers and binder directed to said foraminous screen for curing said binder with said fibers as said fibers and binder are being sprayed onto said foraminous screen.

7. An apparatus for the use in manufacturing fibrous preforms, said apparatus comprising
   a first nozzle for spraying chopped fibers out therefrom;
   a second nozzle for spraying a binder material out therefrom;
   a foraminous screen for receiving said chopped fibers and said binder material thereon;
   a plurality of nozzles circumferentially spaced about said respective first and second nozzle for supplying a flow of heated gaseous medium toward said foraminous screen to heat said screen and the binder and chopped fibers deposited thereon; and
   means for providing relative lateral motion in two planes between the foraminous screen and the respective nozzles.

8. An apparatus as defined in claim 7 further comprising
   said respective first, second and plurality of nozzles being structurally affixed with respect to each other.

9. An apparatus as defined in claim 7 further comprising
   a vacuum means for providing a draw of gaseous medium through said foraminous screen from a side where said plurality of nozzles are positioned to an opposite side.

10. An apparatus for the use in manufacturing fibrous preforms, said apparatus comprising
    a first nozzle for spraying chopped fibers out therefrom;
    a second nozzle for spraying a binder material out therefrom;

a foraminous screen for receiving said chopped fibers and said binder material thereon; and means for providing a heated gaseous flow directed onto said foraminous screen simultaneously with actuation of said first and second nozzles for spraying chopped fibers and binder onto said screen that provides sufficient heat to cure said binder sprayed from said second nozzle.

11. A process for forming a preform comprising the steps of:

drawing a vacuum through a foraminous screen;

spraying chopped fibers and binder from respective nozzles onto said foraminous screen; and heating said binder and depositing said heated binder and said chopped fibers on said screen to form said preform on said foraminous screen.

* * * * *